United States Patent [19]
Fuller

[11] 3,794,349
[45] Feb. 26, 1974

[54] OCCUPANT RESTRAINT SYSTEM
[75] Inventor: Frederick S. Fuller, Romeo, Mich.
[73] Assignee: General Motors Corporation, Detroit, Mich.
[22] Filed: May 19, 1972
[21] Appl. No.: 255,028

[52] U.S. Cl............................. 280/150 AB, 180/90
[51] Int. Cl........................................... B60r 21/08
[58] Field of Search................ 280/150 AB; 180/90

[56] References Cited
UNITED STATES PATENTS

| 3,622,176 | 2/1970 | Byer | 280/150 AB |
| 3,640,546 | 2/1972 | Brawn | 280/150 AB |
| 2,818,933 | 1/1958 | Tell | 180/90 |
| 3,708,179 | 1/1973 | Hulten | 280/150 AB |

Primary Examiner—David Schonberg
Assistant Examiner—Terrance L. Siemens
Attorney, Agent, or Firm—Herbert Furman

[57] ABSTRACT

An occupant restraint system for a vehicle body includes an inflatable cushion mounted within the instrument panel and deployable through an opening of the panel when inflated from a source of pressure fluid. A cover for the opening of the instrument panel includes inner and outer members of plastic material having their edge portions secured to each other to provide an envelope. The inner member is shaped to provide a pair of spaced generally parallel vertical grooves which are bonded to the outer member and define the rupturable or severable side edges of an integral flap. The inner member is further shaped to provide a pair of spaced generally parallel horizontal grooves which extend toward the outer member. One groove connects the vertical grooves intermediate the ends thereof and the other connects the vertical grooves at the lower ends thereof. The space between the inner and outer members is filled with foam material and a reinforcing plate is provided between the members in the area to each side of the vertical grooves and below the other horizontal groove. The one horizontal groove, the juxtaposed portion of the outer member and the foam therebetween provide a first horizontal hinge dividing the flap into two interconnected portions. The other horizontal groove, the juxtaposed portion of the outer member and the foam therebetween provide a second horizontal hinge connecting the flap to the remainder of the cover. When the cushion deploys, the flap is severed along the side edge portions thereof and swings outwardly about the second horizontal hinge. When the flap engages the knees of the seated occupant it folds relative to itself about the first horizontal hinge.

4 Claims, 6 Drawing Figures

PATENTED FEB 26 1974  3,794,349

OCCUPANT RESTRAINT SYSTEM

This invention relates generally to occupant restraint systems and more particularly to a cover assembly for covering the opening of a structural portion of a vehicle within which an inflatable occupant restraint cushion is housed.

Cover assemblies for inflatable occupant restraint systems are well known and such assemblies conventionally include a single layer of rupturable material, such as plastic, which is weakened along predetermined score lines and hinged along other score lines to provide one or more integral flaps which swing open as the cushion is deployed outwardly through the opening defined thereby.

The cover assembly of this invention differs from such known cover assemblies in that it is of multiple layer construction but yet provides an integral flap which is severed therefrom and swung open when a cushion is inflated and deployed through the opening normally covered by the flap. The flap may further fold upon itself by means of an integral hinge when the flap swings open and engages the knees of a seated occupant.

In the preferred embodiment of the invention, the cover assembly includes inner and outer spaced members of rupturable plastic material which have their edge portions secured to each other to provide an envelope. A pair of spaced vertical grooves in the inner member have their bases secured to the outer member and define the vertical side edges of an integral flap. Spaced first and second horizontal grooves of the inner member are depressed toward the outer member to interconnect the vertical grooves at the lower ends thereof and intermediate the ends thereof. The unfilled space between the members is filled with foam material and a reinforcement is provided between the inner and outer members to the outside of the vertical grooves and below the first horizontal groove. The horizontal grooves, the juxtaposed portions of the outer member, and the foam therebetween provide first and second hinges, the first hinging the flap to the remainder of the cover assembly and the second dividing the flap into two integrally hinged portions. The cover assembly has energy absorbing capability due to the foam and the coaction of the foam with the inner and outer members. When the cushion is deployed, the flap is severed along the bases of the vertical grooves and swings outwardly of the resulting opening about the first hinge. When the flap engages the knees of the seated occupant, it folds upon itself about the second hinge.

It is therefore the primary object of this invention to provide an improved cover assembly for an inflatable occupant restraint cushion normally housed within a structural portion of the vehicle, with the cover assembly including an integral flap which may be severed and swing outwardly of the cover assembly upon deployment of the cushion and folded upon itself during such deployment. It is another object of this invention to provide such a cover assembly which has energy absorbing capability when the cushion is not deployed. It is a further object of this invention to provide such a cover assembly which includes spaced members secured to each other in predetermined areas defining the severable edges of an integral flap and cooperating with each other in other predetermined areas to provide an integral hinge between the flap and the remainder of the cover assembly and an integral hinge connecting adjacent portions of the flap. It is yet another object of this invention to provide such a cover assembly which includes spaced inner and outer members defining an envelope which is filled in selected areas with energy absorbing material and which has a severable integrally hinged flap providing an opening through the cover assembly for an inflatable occupant restraint cushion.

These and other objects of the invention will be readily apparent from the following specification and drawings wherein.

Figure 1:
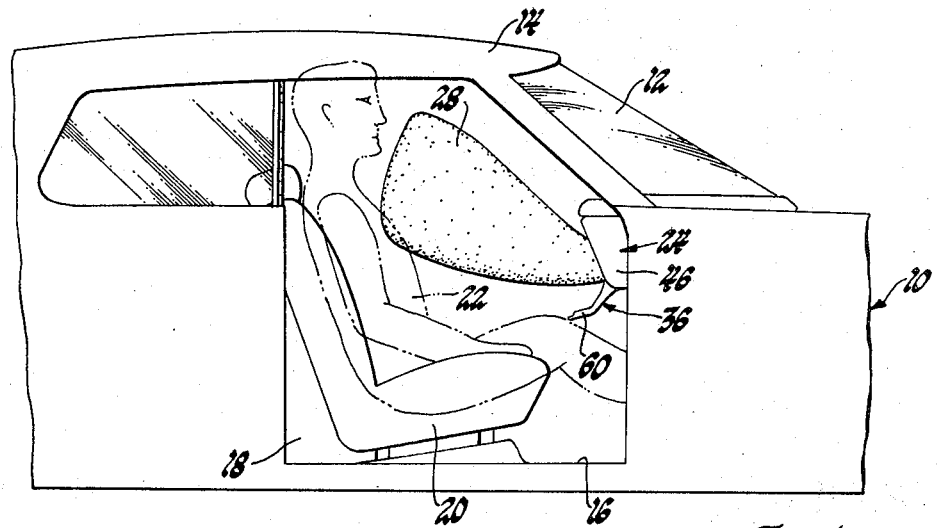
FIG. 1 is a partial side elevational view of a vehicle body having an occupant restraint system embodying a cover assembly according to this invention with the cover assembly being shown with the integral flap thereof in open position and the occupant restraint cushion deployed.

Referring now particularly to FIG. 1 of the drawings, a vehicle body designated generally 10 includes a windshield 12, a roof structure 14 and a floor pan 16 which generally define an occupant compartment 18. A conventional vehicle seat 20 is mounted within the compartment on the floor pan 16 and supports a right-hand front seat passenger schematically indicated at 22 in seated attitude. The vehicle further includes an instrument panel structure 24 which is conventional except for the cover assembly of this invention. Housed within the instrument panel structure is an inflatable occupant restraint system 26, FIGS. 2 and 4, the details of which form no part of this invention but which includes an inflatable occupant restraint cushion 28 shown in FIG. 1 which is deployed from the instrument panel structure 24 for engagement by the occupant 22.

Figure 2:
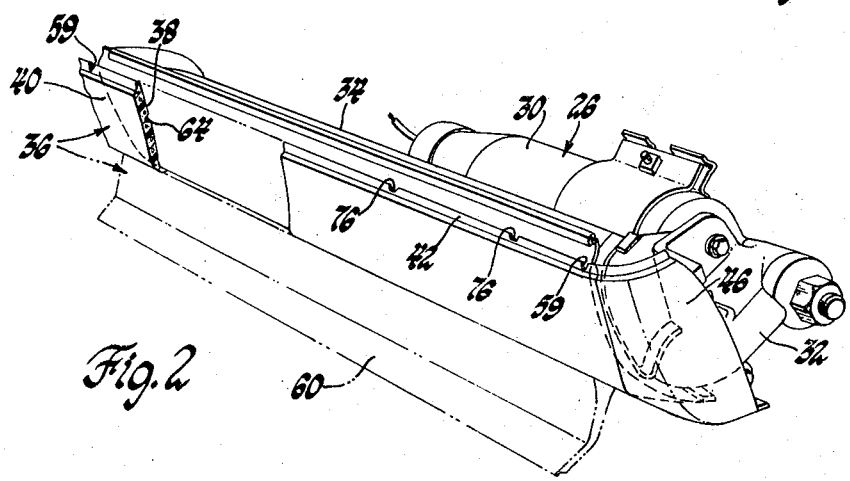
FIG. 2 is a partially broken away perspective view of a portion of FIG. 1 showing the cover assembly in full lines in normal position with the flap thereof unsevered, and in dash lines with the flap thereof severed and in open position.

As shown in FIG. 2, the inflatable occupant restraint system includes an inflator 30 of the air-augmented type having its outlet communicating with a manifold 32 across a conventional rupturable seal arrangement. The manifold 32 communicates with a diffuser, not shown, which is supported on a reaction plate assembly 34, shown in detail in copending application Ser. No. 250,673 (A-17,707) Brockman et al, filed May 5, 1972 and assigned to the assignee of this invention. The diffuser both mounts and inflates the occupant restraint cushion 28. The reaction plate assembly 34 opens outwardly of the panel structure 24 or rearwardly of the vehicle through an opening in the frontal surface of the instrument panel. The opening in the instrument panel is closed by a cover assembly designated generally 36 according to this invention.

Figure 3:
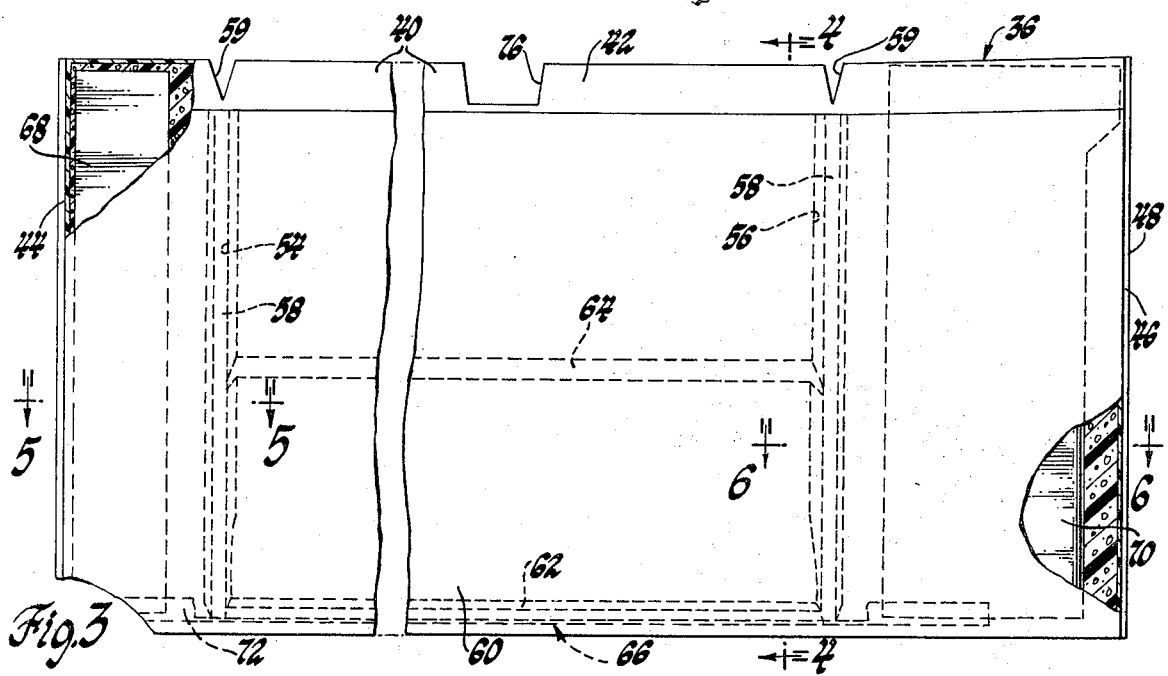
FIG. 3 is an enlarged view of the cover assembly in normal position.
Figure 4:
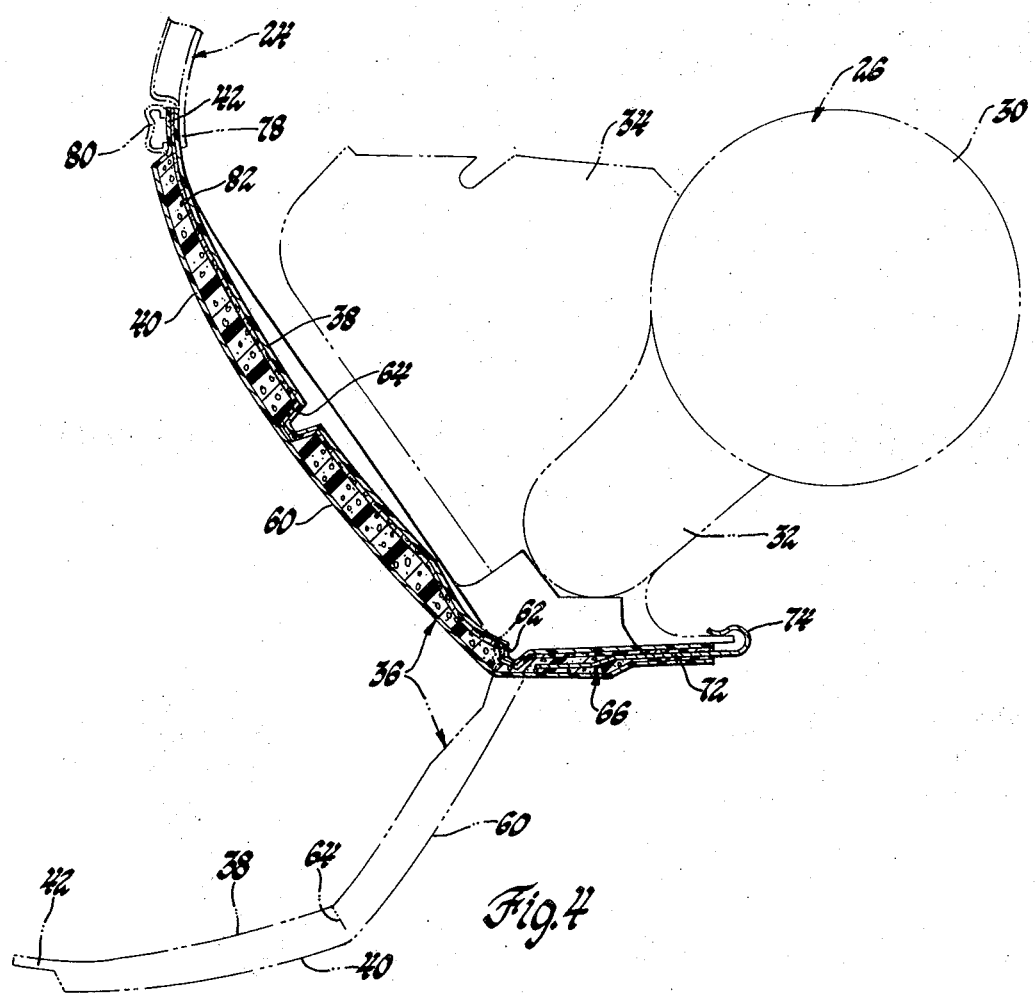
FIG. 4 is a sectional view taken generally along the plane indicated by line 4—4 of FIG. 3.

The cover assembly 36, with reference to FIGS. 3 through 6 inclusive, includes inner and outer members or panels 38 and 40 of suitable rupturable material, such as vacuum formable plastic which cooperatively provide an envelope. The upper flanged edges 42 of the panels 38 and 40 are secured to each other, such as by adhesives or heat bonding as shown in FIG. 4 to close the upper edge of the envelope. The left-hand side edge of panel 40, with respect to the direction in which the occupant 22 is facing, is provided with an offset flange 44, FIG. 5, which is bonded to the inner panel 38 as shown, to close the left-hand side of the envelope. The panel 40 is provided with a right-hand extension 46, FIG. 6, which is flanged at 48 and secured to a flange 50 of an extension 52 of the inner panel 38 to close the right side of the envelope. The extensions 46 and 52 continue the cover assembly around the right-hand side of the instrument panel as can be seen in FIGS. 1 and 2.

Figure 5:
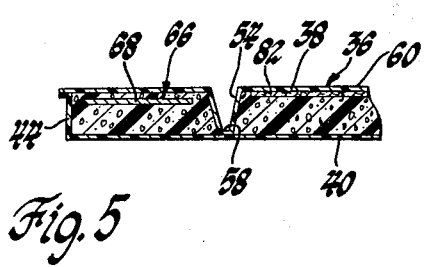
FIG. 5 is a sectional view taken generally along the plane indicated by line 5—5 of FIG. 3.
Figure 6:
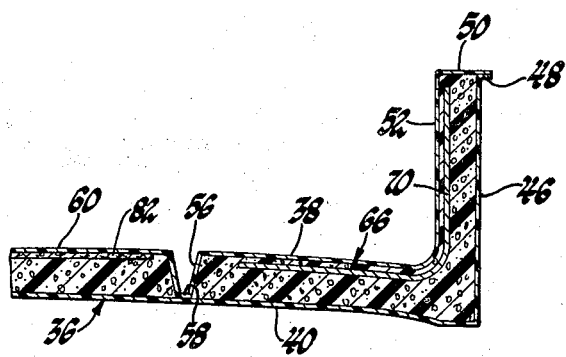
FIG. 6 is a sectional view taken generally along the plane indicated by line 6—6 of FIG. 3.

The inner panel 38 is provided with a spaced pair of vertically extending grooves 54 and 56 as shown in FIGS. 3, 5 and 6, with the base walls 58 of these grooves being bonded, such as by adhesives or heat, to the outer panel 40. The upper ends of the grooves terminate at the bonded flanged edges 42 which are notched at 59 as shown in FIG. 3. As will be aapparent from a further description, the grooves 54 and 56 provide vertical tear or sever lines and define the side edges of an integral flap 60 of the cover assembly 36. As shown in FIGS. 3 and 4, the inner panel 38 is further provided with first and second horizontal grooves 62 and 64. The base walls of these grooves are not secured to the panel 40 as are the base walls 58 of the grooves 54 and 56. Groove 62 connects the lower ends of grooves 54 and 56 and groove 64 extends between the grooves 54 and 56 intermediately thereof. As will be apparent hereinafter, groove 62 cooperates in providing an integral first hinge between the flap 60 and the cover assembly 36 and groove 64 cooperates in providing a second integral hinge between upper and lower portions of the flap 60 after the flap is severed from the cover assembly and engages the knees of the seated occupant 22.

As best shown in FIGS. 3 and 4, a generally U-shaped reinforcing plate designated 66 fits between the inner and outer panels 38 and 40 of the cover assembly in surrounding relationship to the flap 60. The reinforcing plate includes a left-hand vertical leg 68, FIGS. 3 and 5, a right-hand offset vertical leg 70, and a lower horizontal leg 72, FIGS. 3 and 4, which joins the legs 68 and 70. It will be noted with reference to FIG. 4 that the leg 72 is bonded to the lower side edge portions of the inner and outer panels 38 and 40 and cooperates therewith in closing the lower edge of the envelope defined by these panels. This lower horizontal leg 72 includes an integral hook portion 74 which engages over the lower flange of the reaction plate assembly 32 to provide a mounting for the lower edge of the cover assembly 36 on the instrument panel. The space between the panels 38 and 40 except in those areas where the base walls 58 of grooves 54 and 56 are secured to member 40, is filled with a suitable energy absorbing foam material, such as foam vinyl, to fill the envelope defined by the panels.

It will be noted with reference to FIGS. 2 and 3 that the flanged edges 42 of the panels 38 and 40 are notched at a number of places at 76. As shown in FIG. 4, the flanged edges 42 seat against a flange 78 defining the upper edge of the opening in the frontal surface of the instrument panel 24. A suitable decorative molding 80 covers the flanged edges 42, and the notches 76 permit the molding 80 to be secured to the flange 78 by means of suitable clips or fasteners without securing the flanged edges 42 to this flange. Thus the molding 80 releasably secures the upper edge of the flap 60 to the instrument panel structure 24.

With reference to FIGS. 4, 5, and 6, it will be noted that a layer of fabric material 82 is bonded to the inner panel 38 within the confines of the flap 60. The layer of fabric material reinforces the base walls of the horizontal grooves 62 and 64 to ensure that the base walls remain intact and function as hinges when the flap 60 is severed from the remainder of the panel and folds upon itself. The lower edge portion of the fabric material extends between the lower legs 62 of plate 66 and the panel 38 and is bonded to each.

When the inflator 30 receives a command, such as an electrical signal from a source of power upon actuation of a suitable impact sensor, the inflator is actuated to furnish pressure fluid to the diffuser which in turn inflates the cushion 28. As the cushion 28 inflates, it will move outwardly and rearwardly of the reaction plate assembly 34 and exert force against the inner panel 38 of the cover assembly 36. The flap 60 will immediately be severed from the remainder of the cover plate assembly along the tear lines defined by the base walls 58 of grooves 54 and 56 so that the flap can swing downwardly and outwardly of the resulting opening about the first integral horizontal hinge provided by the groove 62, the juxtaposed portion of panel 40, the fabric material 82 and the layer of foam therebetween.

The cushion 28 will thereupon be deployed to its inflated position shown in FIG. 1. As the flap 60 swings outwardly and downwardly, it will engage the knees of the seated occupant 22 as shown in FIG. 1. When this occurs, the upper portion or upper half of the flap folds relative to the lower portion or lower half of the flap about the second integral horizontal hinge provided by the base wall of the groove 64, the juxtaposed portion of panel 40, the layer of fabric 82 and the layer of foam material therebetween. The first and second horizontal hinges include the fabric material 82 and a layer of foam material between the base walls of the grooves 62 and 64 and the juxtaposed portions of panel 40 so that this area of the flap 60 is strengthened and no severing of the flap halves or portions will occur during deployment of the cushion. The notches 59 aid in the severing or rupture of the flap 60 from the remainder of the cover assembly and, of course, the notches 76 permit the portions of the flanged edges 42 intermediate the notches 59 to be pulled outwardly from underneath the molding 80 as the flap is severed and swung open.

During normal vehicle operation under nonimpact conditions, it can be seen that the panels 38 and 40 and the foam material have an energy absorbing capability should there be any engagement with the cover assembly by the occupant 22. When necessary, however, the cover assembly provides an integral flap which may be severed, swung outwardly and folded upon itself to permit an inflatable occupant restraint cushion to be deployed.

Thus, this invention provides an improved cover assembly for an inflatable occupant restraint cushion.

I claim:

1. In combination with a vehicle having a structural portion and an occupant restraint system mounted on the structural portion and including an inflatable occupant restraint deployable from such portion toward a vehicle occupant upon inflation thereof, a cover assembly for such restraint including a mounting portion defining a horizontally elongated opening through which said restraint is deployable and a flap portion of the general shape of the opening for releasably closing such opening, integral hinge means interconnecting the mounting portion and the flap portion at the lower edge of the opening to mount the flap portion on the mounting portion for downward swinging movement relative thereto, means releasably interconnecting the adjacent side edges of the mounting portion and the flap portion to locate the flap portion in a closed position with respect to the opening, deployment of the restraint separating the side edges of the flap portion from those of the mounting portion and swinging the flap portion downwardly to an open position with respect to the opening about the integral hinge means, means permitting folding movement of the flap portion upon itself upon engagement of the flap portion with the vehicle occupant as the flap portion swings downwardly, means reinforcing the mouting portion adjacent the side edges and the lower edge of the opening to ensure the release of the side edges of the flap portion from those of the mounting portion and the swinging movement of the flap portion about the integral hinge means, and means cooperating with the reinforcement means adjacent the lower edge of the opening to provide for mounting of the lower edge portion of the cover assembly on the structural portion of the vehicle.

2. In combination with a vehicle having a structural portion and an occupant restraint system mounted on the structural portion and including an inflatable occupant restraint deployable from such portion toward a vehicle occupant upon inflation thereof, a cover assembly for such restraint including a mounting portion defining a horizontally elongated opening through which said restraint is deployable and a flap portion of the general shape of the opening for releasably closing such opening, each including inner and outer spaced walls of flexible material, means securing said walls to each other to provide the respective side edges of the opening and of the flap portion, the inner and outer walls of said mounting portion and flap portion being integral with each other at the lower edge of the flap portion, said inner wall being provided with an integral depressed rib cooperating with the outer wall to provide an integral hinge mounting the flap portion on the mounting portion for downward swinging movement relative thereto, resilient foam material filling the space between said inner and outer walls, means releasably interconnecting the adjacent side edges of the mounting portion and the flap portion to locate the flap portion in a closed position with respect to the opening, deployment of the restraint separating the side edges of the flap portion from those of the mounting portion and swinging the flap portion downwardly to an open position with respect to the opening about the integral hinge, means permitting folding movement of the flap portion upon itself upon engagement of the flap portion with the vehicle occupant as the flap portion swings downwardly, reinforcement means located between the inner and outer walls of the mounting portion adjacent the side edges and the lower edge of the opening to ensure the release of the side edges of the flap portion from the mounting portion and the swinging movement of the flap portion about the integral hinge, the reinforcement means being bonded to said walls by the foam material, and means cooperating with the reinforcement means adjacent the lower edge of the opening to provide for mounting of the lower edge portion of the cover assembly on the structural portion of the vehicle.

3. In combination with a vehicle having a structural portion and an occupant restraint system mounted on the structural portion and including an inflatable occupant restraint deployable from such portion toward a vehicle occupant upon inflation thereof, a cover assembly for such restraint including a mounting portion defining a horizontally elongated opening through which said restraint is deployable and a flap portion of the general shape of the opening for releasably closing such opening, each including inner and outer spaced walls of flexible material, means securing said walls to each other to provide the respective side edges of the opening and of the flap portion, the inner and outer walls of said mounting portion and flap portion being integral with each other at the lower edge of the flap portion, said inner wall being provided with an integral depressed rib cooperating with the outer wall to provide an integral hinge mounting the flap portion on the mounting portion for downward swinging movement relative thereto, resilient foam material filling the space between said inner and outer walls, means releasably interconnecting the adjacent side edges of the mounting portion and the flap portion to locate the flap portion in a closed position with respect to the opening, deployment of the restraint separating the side edges of the flap portion from those of the mounting portion and swinging the flap portion downwardly to an open position with respect to the opening about the integral hinge, means permitting folding movement of the flap portion upon itself upon engagement of the flap portion with the vehicle occupant as the flap portion swings downwardly, a reinforcement member between said walls of the mounting portion adjacent the side edges and the lower edge of the opening to ensure the release of the side edges of the flap portion from the mounting portion and the swinging movement of the flap portion about the integral hinge, the reinforcement member being bonded to said walls by the foam material, the reinforcement member extending outwardly of said walls adjacent the lower edge of the opening to provide for mounting of the lower edge portion of the cover assembly on the structural portion of the vehicle.

4. In combination with a vehicle having a structural portion and an occupant restraint system mounted on the structural portion and including an inflatable occupant restraint deployable from such portion toward a vehicle occupant upon inflation thereof, a cover assembly for such restraint including a mounting portion defining a horizontally elongated opening through which said restraint is deployable and a flap portion of the general shape of the opening for releasably closing such opening, each including inner and outer spaced walls of flexible material, means securing said walls to each other to provide the respective side edges of the opening and of the flap portion, the inner and outer walls of said mounting portion and flap portion being integral with each other at the lower edge of the flap portion, said inner wall being provided with an integral depressed rib cooperating with the outer wall to provide an integral hinge mounting the flap portion on the mounting portion for downward swinging movement relative thereto, resilient foam material filling the space between said inner and outer walls, means releasably interconnecting the adjacent side edges of the mounting portion and the flap portion to locate the flap portion in a closed position with respect to the opening, deployment of the restraint separating the side edges of the flap portion from those of the mounting portion and swinging the flap portion downwardly to an open position with respect to the opening about the integral hinge, means permitting folding movement of the flap portion upon itself upon engagement of the flap portion with the vehicle occupant as the flap portion swings downwardly, rigid reinforcement means located between the inner and outer walls of the mounting portion adjacent the side edges and the lower edge of the opening to ensure the release of the side edges of the flap portion from the mounting portion and the swinging movement of the flap portion about the integral hinge, the reinforcement means being bonded to said walls by the foam material, flexible reinforcement means between the rib of the inner wall and the outer wall to reinforce the integral hinge, and means cooperating with the rigid reinforcement means adjacent the lower edge of the opening to provide for mounting of the lower edge portion of the cover assembly on the structural portion of the vehicle.

* * * * *